(12) United States Patent
Yseboodt et al.

(10) Patent No.: US 10,216,255 B2
(45) Date of Patent: Feb. 26, 2019

(54) LOW POWER STANDBY FOR A POWERED DEVICE IN A POWER DISTRIBUTION SYSTEM

(71) Applicant: PHILIPS LIGHTING HOLDING B.V., Eindhoven (NL)

(72) Inventors: Lennart Yseboodt, Retie (BE); Matthias Wendt, Würselen (DE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 255 days.

(21) Appl. No.: 15/111,670

(22) PCT Filed: Jan. 7, 2015

(86) PCT No.: PCT/EP2015/050123
§ 371 (c)(1),
(2) Date: Jul. 14, 2016

(87) PCT Pub. No.: WO2015/106992
PCT Pub. Date: Jul. 23, 2015

(65) Prior Publication Data
US 2016/0334856 A1 Nov. 17, 2016

(30) Foreign Application Priority Data

Jan. 14, 2014 (EP) .................................... 14151164

(51) Int. Cl.
| G06F 1/26 | (2006.01) |
| G06F 1/32 | (2006.01) |
| G06F 1/3287 | (2019.01) |
| G06F 1/3206 | (2019.01) |
| G06F 1/3296 | (2019.01) |

(Continued)

(52) U.S. Cl.
CPC ............ *G06F 1/3287* (2013.01); *G06F 1/266* (2013.01); *G06F 1/3206* (2013.01); *G06F 1/3296* (2013.01); *H04L 12/10* (2013.01); *H04L 12/40045* (2013.01); *H02J 2007/006* (2013.01);

(Continued)

(58) Field of Classification Search
CPC ..................................... G06F 1/26; G06F 1/32
See application file for complete search history.

(56) References Cited

U.S. PATENT DOCUMENTS 6,055,206 A * 4/2000 Tanizaki .............. G11C 7/1072
365/229
7,804,859 B2 9/2010 Landry et al.
(Continued)

*Primary Examiner* — Phil K Nguyen
(74) *Attorney, Agent, or Firm* — Meenakshy Chakravorty

(57) ABSTRACT

The invention relates to a power distribution system, such as a Power over Ethernet power distribution system. A powered device provides a pulse, such as a Maintain Power Signature, when in standby such that a power providing device remains providing power to it. To increase energy efficiency, the MPS can be cycled (60 ms pulse every 300 ms to 400 ms) according to the IEEE802.3af/at standards. By introducing a controllable switch, for electrically decoupling at least part of the powered device from the power providing device, and a pulse generator, the MPS can be generated in a more energy efficient way and/or can be shortened (e.g. to 5 ms). As an example, the controllable switch can decouple the bulk capacitor of the powered device during MPS generation to prevent the bulk capacitor from filtering out the MPS.

12 Claims, 9 Drawing Sheets

(51) Int. Cl.
*H04L 12/10* (2006.01)
*H04L 12/40* (2006.01)
*H02J 7/00* (2006.01)

(52) U.S. Cl.
CPC .......... *Y02D 10/171* (2018.01); *Y02D 10/172* (2018.01); *Y02D 50/20* (2018.01)

(56) References Cited

U.S. PATENT DOCUMENTS

| | | | |
|---|---|---|---|
| 7,843,670 B2 | 11/2010 | Blaha et al. | |
| 8,028,175 B2 | 9/2011 | Diab et al. | |
| 8,565,040 B1* | 10/2013 | Chen | G11C 11/4074 365/189.09 |
| 8,868,946 B2 | 10/2014 | Buhari et al. | |
| 2004/0000886 A1* | 1/2004 | Yun | G03G 15/205 318/268 |
| 2004/0183715 A1* | 9/2004 | Arlow | G01S 7/282 342/82 |
| 2006/0019629 A1 | 1/2006 | Berson et al. | |
| 2009/0040857 A1* | 2/2009 | McNeil | G11C 29/02 365/226 |
| 2009/0072806 A1* | 3/2009 | Shiota | G06F 1/26 323/283 |
| 2009/0085586 A1 | 4/2009 | Anderson | |
| 2011/0062785 A1* | 3/2011 | Odland | H02J 1/10 307/80 |
| 2011/0279096 A1* | 11/2011 | Sonntag | H02J 7/34 320/166 |
| 2013/0111245 A1 | 5/2013 | Giat | |
| 2013/0127523 A1* | 5/2013 | Vereb | G06F 1/26 327/536 |
| 2013/0154603 A1 | 6/2013 | Cerutti et al. | |
| 2013/0272054 A1* | 10/2013 | Daudelin | G11O 5/148 365/149 |
| 2015/0303912 A1* | 10/2015 | Coutts | H03K 17/16 307/29 |

\* cited by examiner

LOW POWER STANDBY FOR A POWERED DEVICE IN A POWER DISTRIBUTION SYSTEM

CROSS-REFERENCE TO PRIOR APPLICATIONS

This application is the U.S. National Phase application under 35 U.S.C. § 371 of International Application No. PCT/EP2015/050123, filed on Jan. 7, 2015, which claims the benefit of European Patent Application No. 14151164.2, filed on Jan. 14, 2014. These applications are hereby incorporated by reference herein.

FIELD OF THE INVENTION

The invention relates to a power distribution system comprising a power providing device for providing power and a powered device, such as a luminaire, to be powered by the power providing device. The invention further relates to the power providing device, the powered device, and a power distribution method and computer program product for distributing power within the power distribution system.

BACKGROUND OF THE INVENTION

According to the Power over Ethernet (PoE) Institute of Electrical and Electronics Engineers (IEEE) Standard 802.3af/at a powered device (PD) is powered by power sourcing equipment (PSE) via an Ethernet cable. The PSE is, for instance, a switch and the PD are, for example, internet protocol (IP) cameras, IP phones, wireless access points, luminaires, sensors, fans, et cetera. In accordance with the standard, the PSE is able to determine whether a cable is disconnected, connected to a non-PoE device, or connected to a PoE-compliant PD. This is accomplished in three phases (which follow the Idle state): Detection phase, Classification Phase, and 2-event Classification; after which the PD is powered (in the Operational state).

In the detection phase, the PSE detects whether a PD is connected. During the Detection phase, a PoE-compliant PD will provide a valid detection signature using a capacitor (50 nF-120 nF) and a resistor (25 kΩ; a present only during the Detection phase). As an example, the PSE can apply two voltages in the range of 2.8V to 10V and measures corresponding currents to determine the presence of the signature resistor. Other methods are also allowed, such as sourcing current. In the classification phase, PSE and PD are distinguished as Type-1 complying with the IEEE 802.3af power levels (12.95 W), or Type-2 complying with the IEEE 802.3at power levels (25.5 W). Additionally the 802.3at standard provides a different method of determining the power classification. A Type-2 PSE has the option of acquiring PD power classification by performing 2-event classification (Layer 1) or by communicating with the PD (Layer 2). At the same time a Type-2 PD must be able to identify a Type-2 PSE and communicate over Layer 1 and 2. As part of the 2-event classification, the PSE provides a fixed voltage between 15.5V and 20.5V to the PD.

After determining a PD is connected (and the optional power classification) the PSE powers the PD until the PD no longer uses power. The standard specifies that if a PD requires little to no power, such as in a standby mode, the PD must generate a Maintain Power Signature (MPS). According to IEEE802.3at, the MPS consists of two components, an AC MPS component and a DC MPS component. The PSE shall monitor the DC MPS component, the AC MPS component, or both. The AC MPS component is present when an AC impedance is detected at the power interface equal to or lower than 27 kΩ. The DC MPS requires the PD to draw at least 10 mA, lasting a minimum period of 60 ms. The minimum dropout period is 300 ms (may not drop out) and the maximum drop out period is 400 ms (must drop out).

If no MPS is detected by the PSE, the PSE may disconnect power to the PD. This prevents the PSE from providing power to a port that has been disconnected, which can in turn prevent a person touching such a port (or a cable connected to that port) from getting an electric shock. As another example, this can prevent damage to a non-PoE device being connected to a port of the PSE to which power is applied.

Currently discussions are coming up to use the PoE standard for all kinds of loads like lighting equipment (sensors, switches, light sources etc.) or entertainment appliances like active speakers, internet radios, DVD player, set-top boxes and even TV sets. A future standard is then needed that support higher power levels, such as levels up to 60 W or more per Cat5/6 connection. Such discussions are not only ongoing related to PoE, but also related to other (similar) standards such as the EMerge Alliance Occupied Space Standard or the USB Power Delivery standard. Together with this development of higher power devices being powered through such power distribution systems, there is also a development that the number of devices that is powered through these systems increases. There is therefore a need to develop a power distribution system with increased electrical efficiency.

SUMMARY OF THE INVENTION

It is an object of the present invention to provide a power distribution system with increased electrical efficiency. Especially in a standby mode, energy is 'wasted' in many power distribution systems in order to create a keep-alive type signal. For PoE, the IEEE802.3af/at standards for instance require the consumption of electrical energy by the PD to create a MPS, when the PD is operating in a mode (e.g. a standby mode) wherein otherwise (almost) no electrical energy is consumed. Although the MPS needs only to be generated periodically, it leads to approximately a minimum of 100 mW of power consumption. In a first aspect of the invention a power distribution system is provided, the power distribution system comprising: a power providing device, a powered device and an electrical conductor. The power providing device is arranged for providing power. The powered device is arranged for being detachably, electrically coupled to the power providing device. It comprises a load, such as a lighting device, and is further arranged for being powered by the power providing device. The electrical conductor is arranged for detachably, electrically coupling the power providing device to the powered device. It is further arranged for transferring the power from the power providing device to the powered device.

In the power distribution system, the power providing device is further arranged for sensing a current flow from the power providing device to the powered device, and for providing power when, at least periodically, a current equal to or greater than a minimum current is sensed. This current flowing from the power providing device to the powered device can be, for example, an MPS or another type of pulse or keep-alive signal.

In the power distribution system, the powered device is further arranged for operating in a standby mode wherein, at least part of the time, the load draws a current smaller than the minimum current, and in an operational mode wherein, at least part of the time, the load draws a current equal to or greater than the minimum current. When in the standby mode, the powered device does not draw sufficient power for the power providing device to remain powering the powered device.

In the power distribution system, the powered device further comprises a controllable switch and a pulse generator circuit. The controllable switch is arranged for electrically decoupling at least part of the powered device from the power providing device. The pulse generator circuit is arranged for drawing, for a pre-determined time period and with a pre-determined frequency, a pulse current equal to or greater than the minimum current from the power providing device, when the powered device is operating in the standby mode, through controlling at least the controllable switch. When the powered device, through the pulse generator circuit periodically draws a current equal to or greater than the minimum current, the power providing device will remain providing power. However, when small amounts of power are drawn, electrical components that are part of the powered can filter out the pulse, change its shape, etc., thereby preventing the power providing device from sensing the current flow and thereby preventing the power providing device from remaining to provide power to the powered device. By controlling the controllable switch, the pulse can be generated in a manner that allows the powered device to operate more energy efficiently. As a first example, in a PoE compliant PD, the controllable switch can decouple the bulk capacitor when the pulse is generated, preventing this component from filtering out the pulse. This allows, for example, the pulse to be shortened. As another example, through decoupling, via the controllable switch, the load from the power providing device, the energy consumed in generating the pulse is more effectively used (e.g. no energy is stored in active components in the load, where in standby mode this is "wasted").

In an embodiment of the power distribution system according to the invention, the pulse generator circuit of the powered device comprises: a resistor, a pulse generator switch and a controller. The resistor is arranged for consuming the pulse current. The pulse generator switch is placed in series with the resistor. The controller is arranged for controlling the pulse generator switch and the controllable switch, and is further arranged for cycling between a pulse generation mode wherein the pulse generator switch is turned on and the controllable switch is turned off, for consuming the pulse current, and a non-pulse generation mode wherein the pulse generator switch is turned off and the controllable switch is turned on. In this embodiment, the pulse current, such as a MPS, is consumed by the resistor and the controllable switch decouples at least part of the powered device, such as the bulk capacitor.

In another embodiment of the power distribution system according to the invention, the pulse generator circuit of the powered device comprises: a buffer capacitor and a controller. The buffer capacitor is arranged for storing electrical energy received from the power providing device when the controllable switch is turned on. The controller is arranged for controlling the controllable switch, and is further arranged for cycling between a pulse generation mode wherein the controllable switch is turned on and the buffer capacitor is charged, and a non-pulse generation mode wherein the controllable switch is turned off and the electrical energy stored in the buffer capacitor is consumed.

In yet another embodiment of the power distribution system according to the invention, the powered device comprises a power converter and the pulse generator circuit of the powered device comprises a controller. The controller is arranged for controlling the power converter and the controllable switch, and the controller is further arranged for cycling between a non-pulse generation mode wherein the controllable switch is turned on and storage components of the power converter are charged and a pulse generation mode wherein the controllable switch is turned off and the electrical energy stored in the storage components of the power converter is consumed. Optionally, the power converter can be controlled in a controlled input current mode.

In a further embodiment of the power distribution system according to the invention, the powered device comprises a pulse transformer and the pulse generator circuit of the powered device comprises a controller. The controller is arranged for controlling the pulse transformer and the controllable switch, and the controller is further arranged for cycling between a pulse generation mode wherein a primary current is generated in the primary winding of the pulse transformer, and a non-pulse generation mode. In this embodiment, the primary current generated in the primary winding of the pulse transformer in the pulse generation mode is transformed into a secondary current in the secondary winding of the pulse transformer, the secondary current equal to or greater than the minimum current; and the secondary winding of the pulse transformer is electrically coupled to a closed current loop with the power providing device, wherein the controllable switch is arranged for short circuiting the primary winding of the pulse transformer in the non-pulse generation mode. Optionally, the powered device further comprises a current sensor arranged for sensing a current flow from the power providing device to the powered device, and the controller is further arranged for adjusting the amplitude of the injected current by the pulse transformer based on the sensed current flow.

In an especially advantage embodiment of the power distribution system according to the invention, the pre-determined time period is equal to or less than 5 ms, and the pre-determined frequency is at least one pulse every 400 ms, and wherein the minimum current is 20 mA or less, preferably 10 mA. This embodiment applied to a PoE power distribution system, allows for the electrical energy to be consumed as part of the MPS to be reduced.

In various embodiments of the power distribution system according to the invention, the power providing device is Power Sourcing Equipment as specified in the Power over Ethernet standards, and/or the electrical conductor is an Ethernet cable and/or the powered device is a Powered Device as specified in the Power over Ethernet standards, optionally wherein the pulse generator circuit is part of a physical interface chip or chipset, comprised in the Powered Device.

In an embodiment of the power distribution system according to the invention, the Powered Device as specified in the Power over Ethernet standards comprises an isolation switch, wherein the controllable switch is the isolation switch. As a PD according to the PoE standards requires an isolation switch to be present, this switch can be used as the controllable switch thereby saving the need for adding an additional component.

In a second aspect of the present invention, a power providing device is provided, the power providing device arranged to be used in a system according to the invention.

In a third aspect of the invention, a powered device is provided, the powered device arranged to be used in a system according to the invention.

In a fourth aspect of the invention methods are provided for generating a current pulse in a powered device electrically coupled to a power providing device are provided. In a first method according to the invention, the method comprises the steps of: electrically decoupling at least part of the powered device from the power providing device; and consuming electrical energy received from the power providing device. In a second method according to the invention, the method comprises the steps of: storing electrical energy received from the power providing device in a storage component, electrically decoupling at least part of the powered device from the power providing device; and consuming the electrical energy stored in the storage components.

In a fifth aspect of the invention a computer program product is provided, the computer program product arranged for executing the steps of any of the methods according to the invention.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

The IEEE 802.3af/at standards define a power and data distribution system, which allows distributing power and data via a twisted-pair Ethernet cable. According to this standard, electrical consumers can be connected to a switch for receiving power from the switch and for exchanging data, wherein the switch comprises several ports and wherein to each port a single electrical consumer can be connected. Ethernet is a family of computer networking technologies for local area networks (LANs). Ethernet was commercially introduced in 1980 and standardized in 1985 as IEEE 802.3 by the IEEE. Ethernet has largely replaced competing wired LAN technologies. The Ethernet standards comprise several wiring and signaling variants of the Open Systems Interconnection (OSI) physical layer in use with Ethernet. The original 10BASE5 Ethernet used coaxial cable as a shared medium. Later the coaxial cables were replaced by twisted pair and fiber optic links in conjunction with hubs or switches.

The 10BASE-T Ethernet standard was designed for point-to-point links only, and all termination was built into the Ethernet device. Higher speed connections use initial auto-negotiation to negotiate about speed, half duplex and full duplex and master/slave. This auto-negotiation is based on pulses similar to those used by 10BASE-T devices to detect the presence of a connection to another device. When the auto-negotiation has finished, the devices only send an idle byte when there is no data send, to keep the link up.

PoE is an active standard (IEEE 802.3.af and IEEE 802.3.at) which allows a PoE supply to provide electrical energy to detached networked electrical consumers like routers, switches, printer spoolers, et cetera over their standard Ethernet cable connection. Here actual standardization is going to support power levels even above 50 W per Cat5 connection. Currently, discussions are coming up to use the same standard for all kinds of low power consumers like lighting equipment (sensors, switches, light sources) or entertainment appliances like active speakers, internet radios, Digital Versatile Disk (DVD) players, set-top boxes and even television (TV) sets. PoE phones and PoE powered control devices are becoming already common practice in offices.

Figure 1:
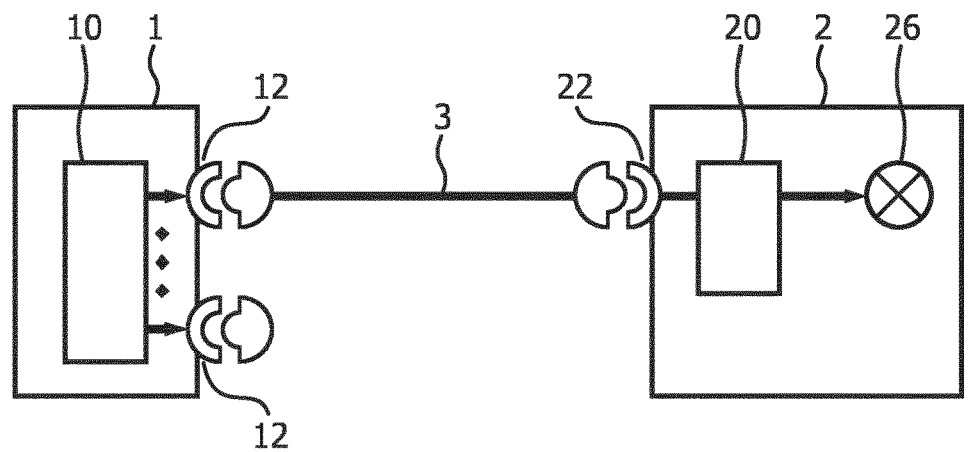
FIG. 1 shows schematically and exemplarily an embodiment of a power distribution system.

FIG. 1 shows a conventional architecture of a PoE based lighting system with a central power supply device (e.g. power sourcing equipment (PSE)) 1 with a plurality of PoE enabled output ports 12. For each load device 2 one of the output ports 12 gets wired by Cat5/6 cables 3 with connectors. In the example of FIG. 1, the load device 2 is a PoE lamp that incorporates a light source 26 and a PD controller/driver 20. Other load devices could also comprise fans, sensors or user interface devices like displays or switch panels. The supply device 1 comprises a PSU controller 10 which controls for each individual output port 12 the applied voltage and monitors for over-current with respect to the power request signalled by the PD controller 20 in each load device.

Figure 2:
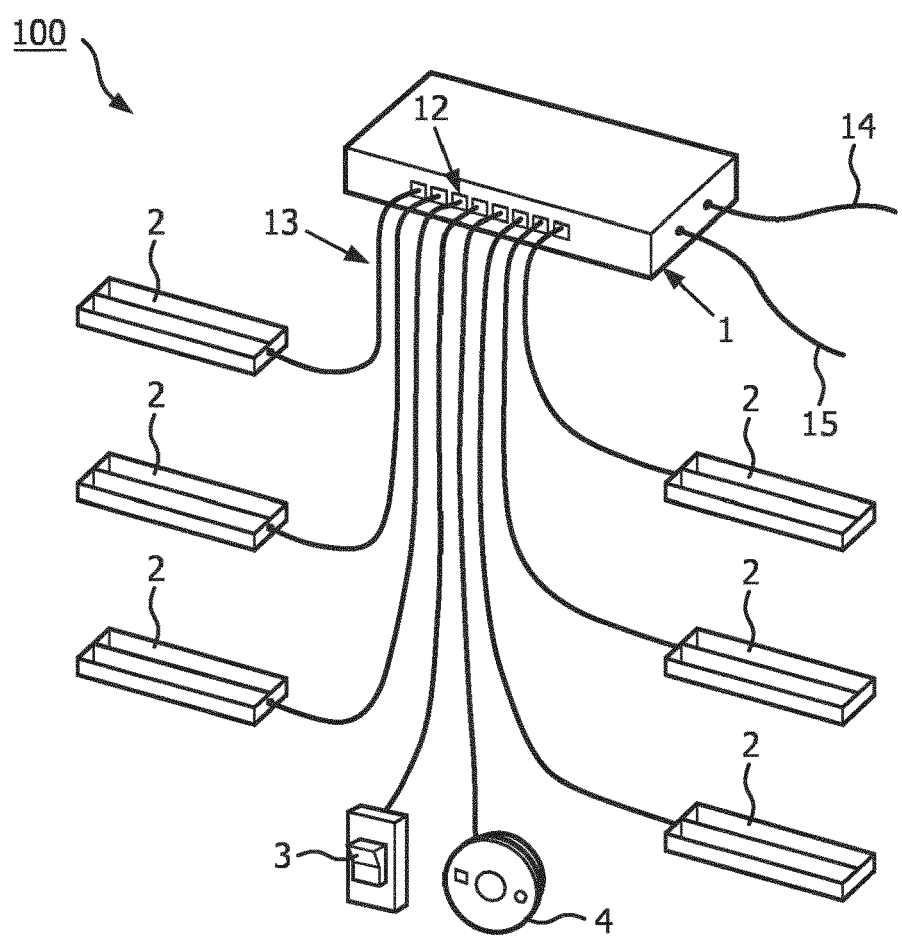
FIG. 2 shows schematically and exemplarily an embodiment of a power distribution system for a lighting application.

FIG. 2 shows schematically and exemplarily an embodiment of a power distribution system 100 for a lighting application, comprising a power sourcing device 1 for sourcing a power to powered devices 2, 3, and 4. The power sourcing device 1 comprises several ports 12 to which the powered devices 2, 3, and 4 are connected via Ethernet cables 13, which are adapted to convey the sourced power along with data. The power sourcing device 1 receives an input power via an electrical connection 15 that may be directly connected to a mains outlet (not shown in the figure), and the data may be received from another device (not shown in the figure), e.g., a switch, via another Ethernet cable 14. From the received power, a power supply unit 11 generates the power to be sourced to the powered devices 2, 3, and 5 via a power device manager 18. The data may be processed by a network data processor 19 before being sent to a respective powered device 2, 3, or 4 via the power device manager 18.

Here, the powered devices 2, 3, and 4 include luminaires 2, a switching element 3, and a presence sensor 4. These can be adapted such that the switching element 3 and/or the presence sensor 4 send dimming commands to the luminaires 2 via the switch 1 after the switching element 3 has been actuated by a person and/or the presence of a person has been detected by the presence sensor 4.

Figure 3:
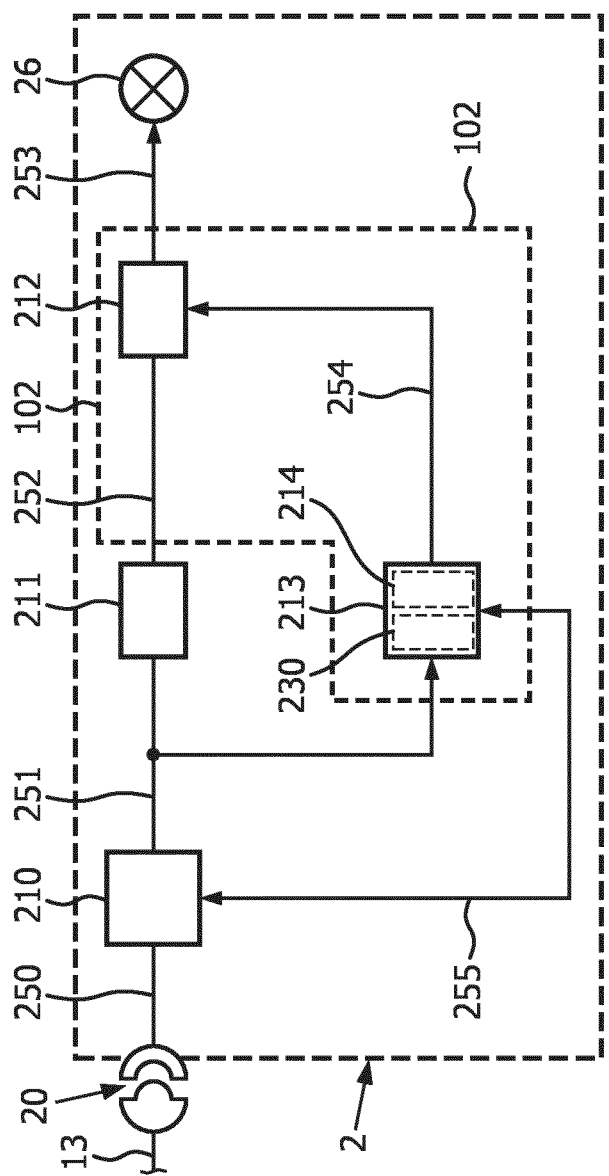
FIG. 3 shows schematically and exemplarily an embodiment of a powered device for a lighting application.

A luminaire 2 is schematically and exemplarily shown in more detail in FIG. 3. The luminaire 2 comprises an electrical load 26, in this embodiment, a light-emitting diode (LED). The luminaire 2 comprises an electrical load power providing unit 102 for generating from the power sourced by the power sourcing unit 1 an electrical load power and for providing the electrical load power to the electrical load 8. The Ethernet cable 13 is connected to a jack 20 of the luminaire 2. The conveyed power along with the data is provided to a power-data splitter 210 via a power-data path 250. The power-data splitter 210 splits the power and the data conveyed by the Ethernet cable 13. The split data is then conveyed further via the data path 255 and the split power is conveyed further via the power path 251. The power-data splitter 210 comprises, e.g., a magnetic circuit for splitting the power and data signals.

The luminaire 2 further comprises a powered device controller 211 for identifying the luminaire 2 in the PoE system (and optionally for negotiating a power class with the switch 1. The electrical load power providing unit 102 comprises an electrical load driver 212 for generating from the power sourced by the power sourcing device 1, which is received by the electrical load driver 212 via the powered device controller 211, an electrical load power and for providing the electrical load power to the LED 26 (and optionally an electrical load power controller 213 for determining the power level of the electrical load power such that the input current drawn by the powered device 2 from the power sourcing device 1 is maximized below a predefined upper input current threshold, e.g., the 0.6 A defined by the PoE standard 802.3at for power class 4, and for sending a power control signal being indicative of the determined power level via a control signal path 254 to the electrical load driver 212). The electrical load driver 212 is adapted to generate from the sourced power the electrical load power in accordance with the power control signal received from the electrical load power controller 213. The electrical load power is provided from the electrical load driver 212 to the LED 26 via an electrical load power path 253. The electrical load driver 212 is adapted to generate the electrical load power by generating a corresponding electrical load driving current for driving the LED 26. The electrical load power providing unit 102, in particular, the electrical load power controller 213 or the electrical load driver 212 may be adapted to low pass filter the control signal.

The PoE standard IEEE 802.3at is a very conservative standard with a large number of safety provisions. It is designed to work in just about every conceivable way that CAT3 (Category 3), CAT5 (Category 5), and CAT6 (Category 6) cables and Ethernet are being used globally. This carries a lot of history and backwards compatibility into the standard and also allows for the support of quite "esoteric" usage scenarios. These include, e.g., compatibility with CAT3 cables (which are practically not used anymore for at least 10 years), backwards compatibility with an old AC-based disconnect detection scheme, and compatibility with crossover cables (which are practically irrelevant in end-node connections for at least 5 years).

With PoE used for Lighting devices are introduced that are computationally much simpler than most other PD (such as access points and point-tilt-zoom cameras). Lighting devices also have large periods of 'off' time where the required power is very low. The device must only be able to maintain an Ethernet link and possibly power a low power sensor. With the recent introduction of IEEE 802.3az and modern physical interfaces (e.g. integrated into a single microcontroller) it becomes possible to maintain an Ethernet link for less than 100 mW. By reducing the width of the MPS pulse to, for example, 5 ms out of every 355 ms, energy efficiency can be increased. However, when such short pulses are drawn from the capacitors at the PD side they are not visible to the current sensing mechanism at the PSE side. The issue is in the larger $C_{BULK}$ capacitor that is located after the PD interface (see FIG. 1) combined with the impedance of the cable (and some of the other components).

Figure 4:
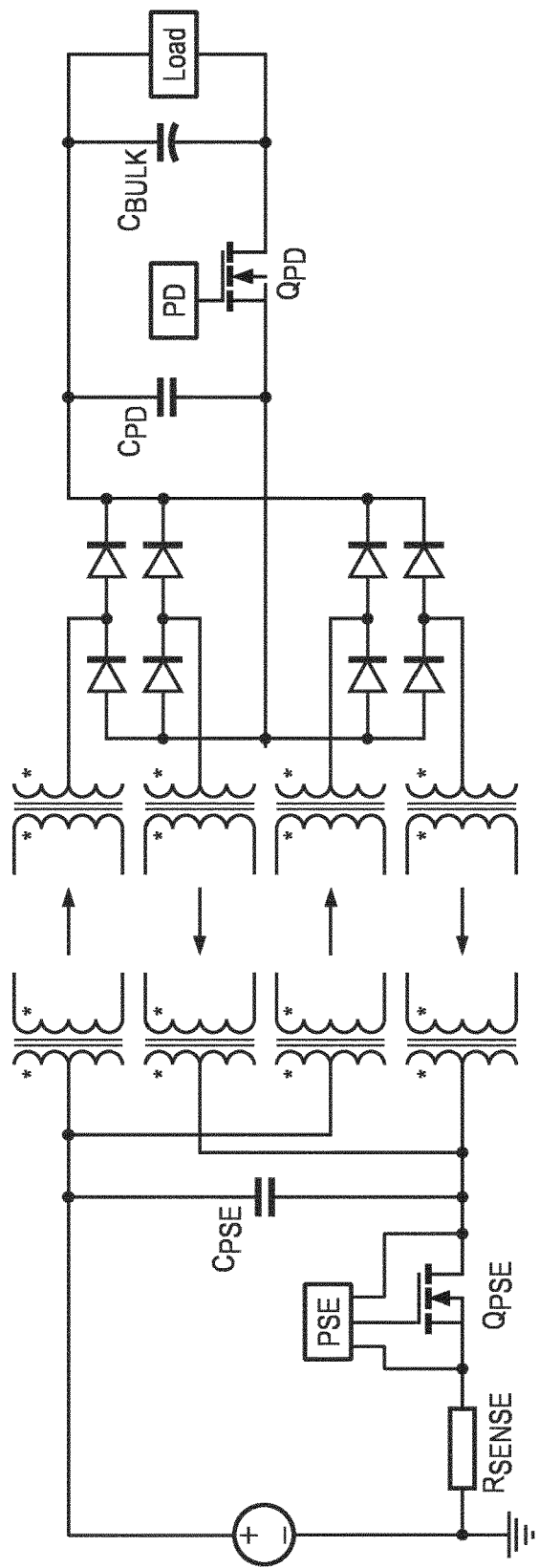
FIG. 4 shows schematically and exemplarily a simplified PSE/PD schematic with filtering elements ($C_{BULK}$, $C_{PD}$, $C_{PSE}$) and the cable impedance (resistance and inductive value)

In FIG. 4, a simplified PSE/PD schematic with filtering elements ($C_{BULK}$, $C_{PD}$, $C_{PSE}$) and the cable impedance (resistance and inductive value) is shown. The PSE senses a current flow from the PSE to the PD (via one of the PSE's ports) over a sense resistor ($R_{SENSE}$). The PSE has a capacitor ($C_{PSE}$). The PSE has a switch that controls the port to which the PD is connected ($Q_{PSE}$). The PD is connected to the PSE over an Ethernet cable, comprising two wire-pairs. On the side of the PD there are two diode bridges to ensure that the correct polarity is provided to the load (e.g. a luminaire). The PD comprises a capacitor ($C_{PD}$) and a bulk capacitor ($C_{BULK}$). A controllable switch ($Q_{PD}$), such as an isolation switch, can decouple the load (and $C_{BULK}$) from the PSE.

Figure 5:
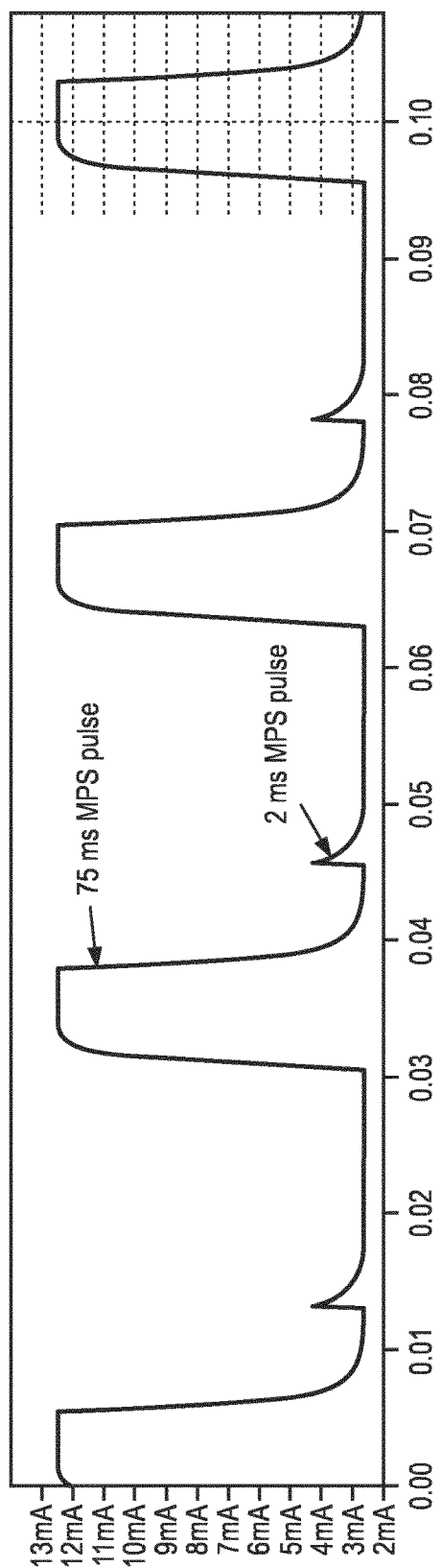
FIG. 5 shows schematically and exemplarily a LT-spice simulation showing the current flow through RSENSE with a 75 ms pulse and a 2 ms pulse of 10 mA generated after the PD interface.

A simulation confirms (see FIG. 5) that with a typical PD bulk capacitor, such as a capacitor of 220 μF, the MPS pulse is almost not visible at the PSE sense resistor. In one embodiment of the invention, this is overcome through disabling the effect of the bulk capacitor during pulsed MPS operation. Such can be achieved by drawing the MPS pulse current before the PD interface and by turning off the PD internal switch QPD during the short interval that the MPS current is being drawn. This will result in a correct current waveform through $R_{SENSE}$ while having minimum effect on the PD device. A controller having joint control of the PD switch and the MPS current resistor is part of a first embodiment of this solution. As an example, the functionality can be integrated into the PD interface chip, but it can also be implemented outside of the chip.

Figure 6:
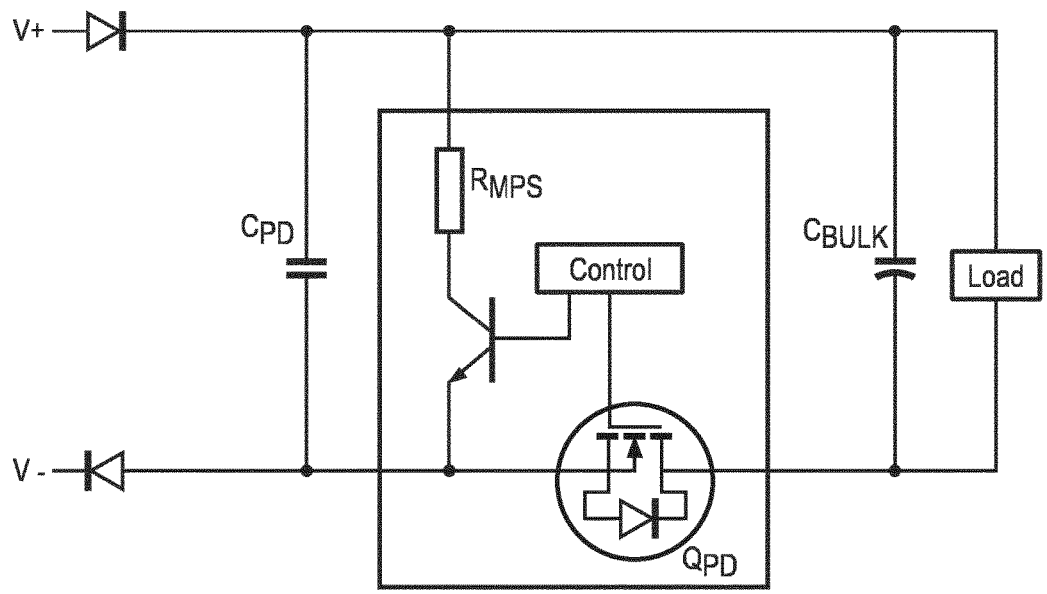
FIG. 6 shows schematically and exemplarily an embodiment of a powered device according to the invention comprising a resistor and switch.

FIG. 6 shows an embodiment of a PD according to the invention, comprising a resistor and switch. The V+/V− are the inputs, electrically coupled to the Ethernet cable interface (e.g. via the full diode bridge providing the correct polarity). A pulse generator circuit comprises: a control block (CONTROL), a switch and a resistor ($R_{MPS}$). The control block is arranged for controlling the switch which is placed in series with the resistor over the V+/V− inputs. By opening the switch, a current flows through $R_{MPS}$ to create the MPS. The control block is further arranged to control $Q_{PD}$. By simultaneously turning off $Q_{PD}$ while the MPS current is being drawn, $C_{BULK}$ is electrically decoupled from the pulse generator circuit and the PSE.

By drawing the MPS pulse current before the PD interface, while simultaneously turning of the PD switch to disable the filtering effect of the bulk capacitor typically located after the PD interface. This prevents that the MPS is filtered out by the $C_{BULK}$ leading to the MPS not being detected by the PSE and the PSE turning off power to the port to which the PD is connected.

The controllable switch ($Q_{PD}$) can be the isolator switch in PoE compliant PD or separate switch, for example a switch that only disconnects one or more capacitors, such as a bulk capacitor. The isolator switch is part of all PoE compliant PD and disconnects the return side of the PD from the physical interface during Detection and Classification phases, or during power loss. According to the standard, the PD is further required to turn on the isolating switch at PI voltage levels of 42V or higher, and turn off the isolating switch at physical interface voltage levels of 30V or lower. In case PD circuit output is connected to a bulk capacitor of 180 µF or more, PD must actively limit the current during start-up to 350 mA or less.

Figure 7:
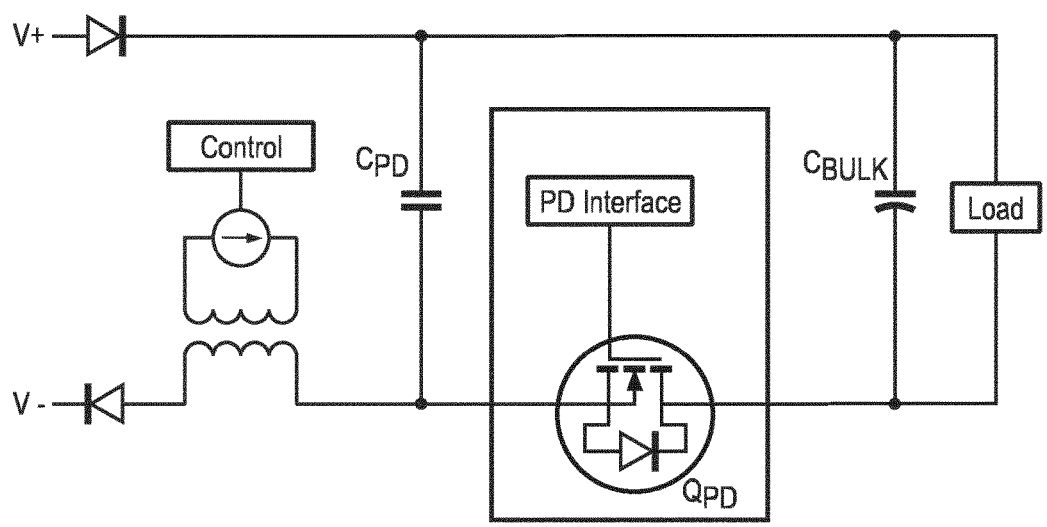
FIG. 7 shows schematically and exemplarily an embodiment of a powered device according to the invention comprising a magnetic field storage component.

In FIG. 7 a PD is shown, according to an embodiment of the invention, comprising a magnetic field storage component. In this example, a pulse transformer in series with the main current loop is used to inject extra current with the desired MPS pulse waveform. Here the isolation switch is conducting as the MPS is generated. The pulse generator generates a primary current in the primary winding of the pulse transformer. This gets transformed into a secondary current which is (at least) the minimum current, allowing the current flow from PSE to PD to be seen at the side of the PSE. To conduct the current pulse to the PSE, the pulse transformer is connected on the secondary winding to a closed current loop to the PSE. The current from V− flows through the isolation switch through $C_{BULK}$ (as $Q_{PD}$ is open) and towards V+; the secondary winding is placed anywhere in this loop in series.

As the pulse transformer isolates the pulse generator from the MPS current loop, it can be implemented in various different circuits. As an example, a capacitor can be used that discharges into the transformer's primary windings. In this embodiment, the control block can control a controllable switch that, when no MPS is generated in the primary winding of the transformer, short circuits the primary winding in order to keep the voltage drop over the transformer's secondary winding low as this would reduce the voltage at the PD.

Figure 8:
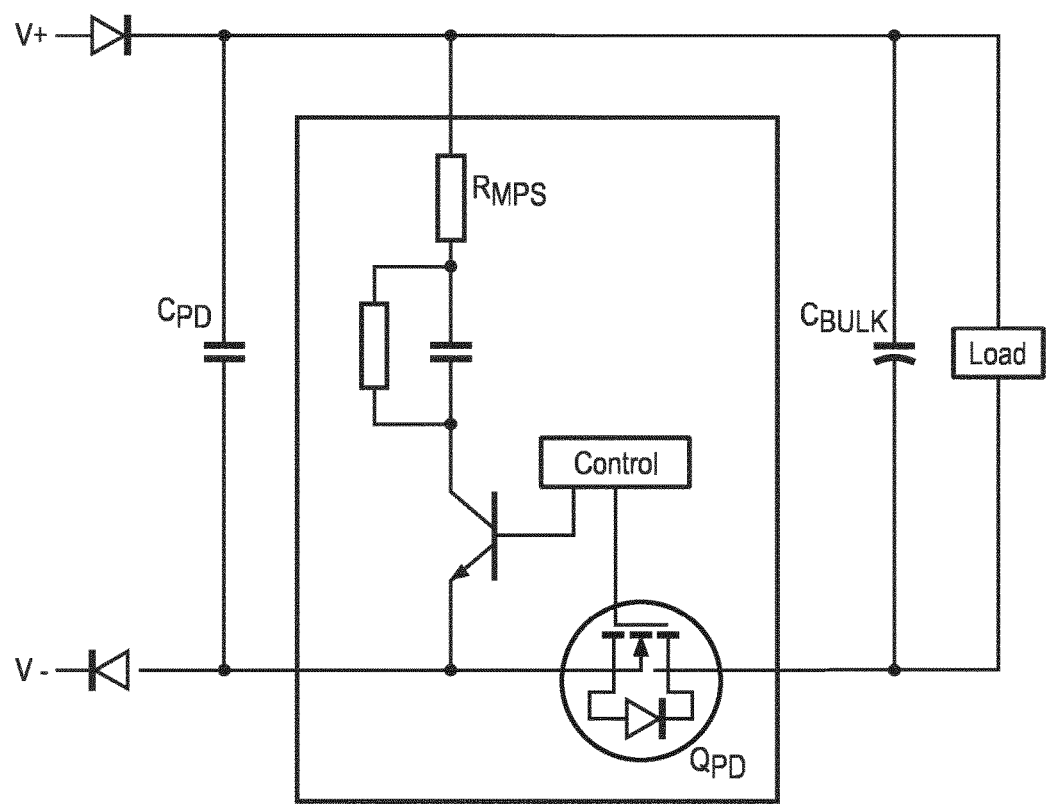
FIG. 8 shows schematically and exemplarily an embodiment of a powered device according to the invention comprising resistor/capacitor series, FIG. 9A and FIG. 9B each show schematically and exemplarily an embodiment of the method according to the invention.

FIG. 8 shows an embodiment of a PD a resistor/capacitor series is used. To generate the pulse a simple resistor can be used to draw the desired current, but also an resistor/capacitor series connection between V+ and V−.

In any embodiment of the invention, the changes made to characteristics of the MPS can be limited to the duration (and optionally the cycle) of the MPS. As an example, the maximum time that the power providing device, e.g. a PSE, will remain providing power without having sensed a current flow from the power providing device to the powered device (e.g. the MPS), is the same as in the current IEEE 802.3 standard (see Table 1). This can be beneficial from a safety perspective.

TABLE 1

Comparison of current PoE standard to embodiment according to the invention

| Parameter | Current IEEE 802.3af/at standard | | Values in embodiment according to the invention | |
|---|---|---|---|---|
| | power providing device/PSE | powered device/PD | power providing device/PSE | powered device/PD |
| $I_{HOLD(MAX)}$ | 10 mA | | 10 mA/20 mA | |
| $I_{PORT\_MPS}$ | | 10 mA | | 10 mA/20 mA |

TABLE 1-continued

Comparison of current PoE standard to embodiment according to the invention

| Parameter | Current IEEE 802.3af/at standard | | Values in embodiment according to the invention | |
|---|---|---|---|---|
| | power providing device/PSE | powered device/PD | power providing device/PSE | powered device/PD |
| $T_{MPS}$ | 60 ms | (75 ms) | 5 ms | (7 ms) |
| $T_{MPDO(min)}$ | 300 ms | (250 ms) | 355 ms | (318 ms) |
| $T_{MPDO(max)}$ | 400 ms | | 400 ms | |

In table 1 a comparison is made between the MPS timing and current values of the current IEEE 802.3af/at standards and the MPS values that can be used in a system according to the invention. $I_{HOLD(max)}$ is the maximum current of the MPS at the PSE side, while $I_{PORT\_MPS}$ is the current flow generated by the PD; $T_{MPS}$ is the duration of the MPS; $T_{MPDO(min)}$ is the minimum time between MPS pulses and $T_{MPDO(max)}$ is the maximum time allowed between MPS pulses. All of these values are for illustration purposes only.

It is possible to ensure backwards compatibility between PSE and PD that implement the invention and ones that do not, as shown in Table 2.

TABLE 2

Compatibility between PD and PSE supporting either MPS according to IEEE 82.3af/at or shorter MPS according to an embodiment of the invention

| | PD according to IEEE 802.3af/at (Type 1 or Type 2) | PD according to embodiment of the invention |
|---|---|---|
| PSE according to IEEE 802.3af/at (Type 1 or Type 2) | — | PD identifies PSE as PSE according to IEEE 802.3af/at not supporting the shorter MPS, PD uses MPS as per IEEE 802.3af/at standard |
| PSE according to embodiment of the invention | PSE will detect MPS as per IEEE 802.3af/at | PD identifies PSE as PSE supporting the shorter MPS, PD uses shorter MPS |

Figure 9A:
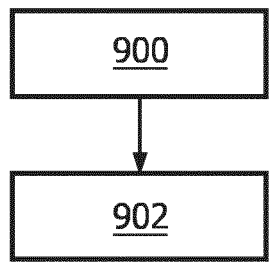
Figure 9B:
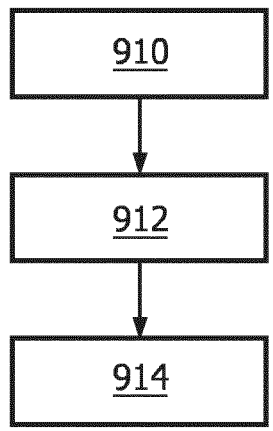
Figure 10:
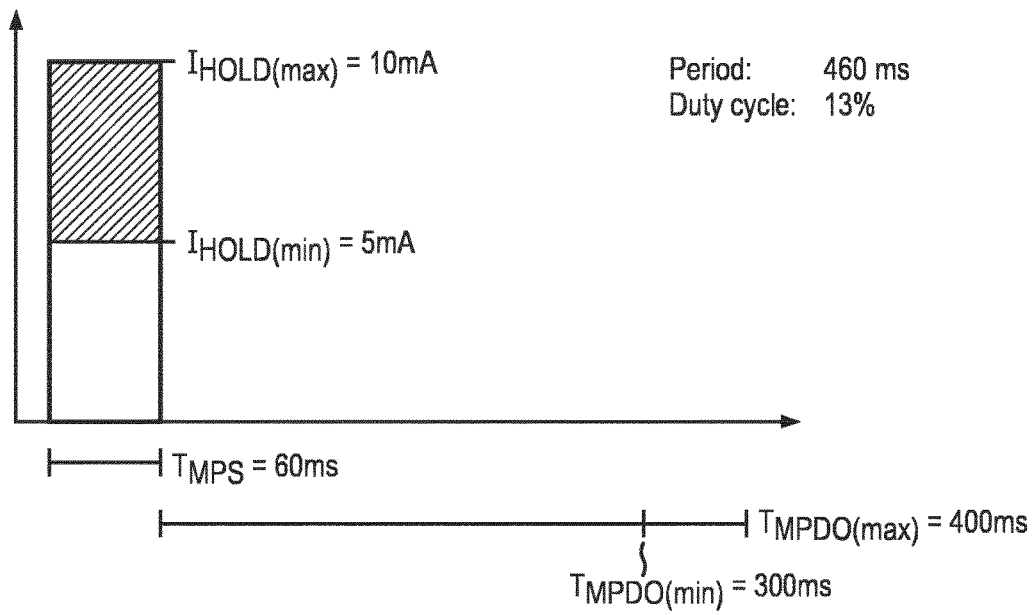
FIG. 10 shows schematically and exemplarily an overview of MPS timing according to IEEE 802.3af/at from the PSE side.
Figure 11:
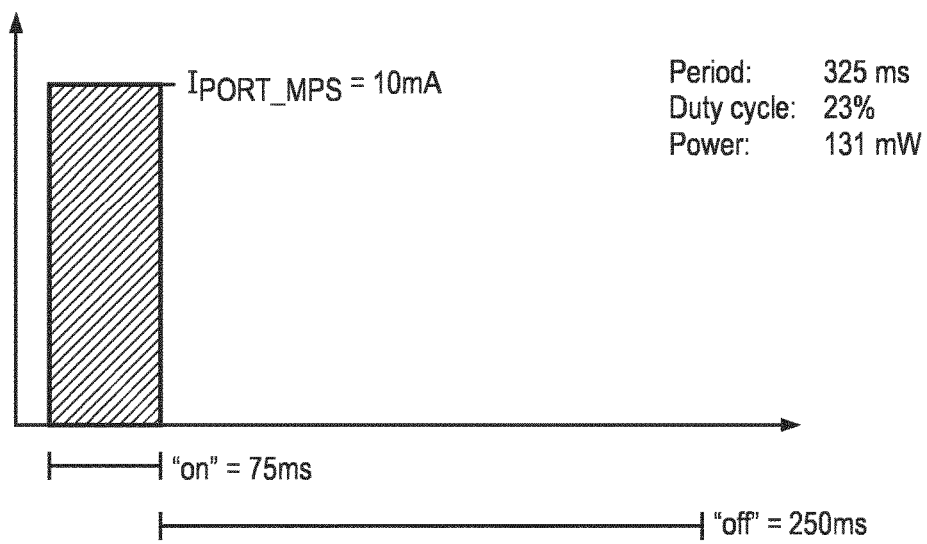
FIG. 11 shows schematically and exemplarily an overview of MPS timing according to IEEE 802.3af/at from the PD side.
Figure 12:
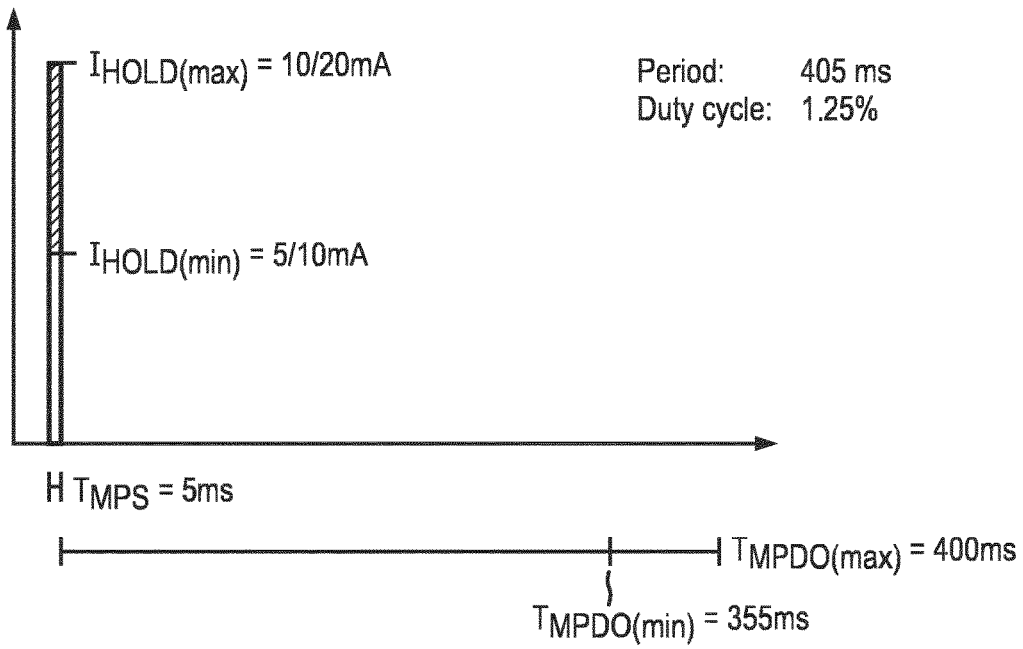
FIG. 12 shows schematically and exemplarily an overview of MPS timing according to an embodiment of the invention from the PSE side.
Figure 13:
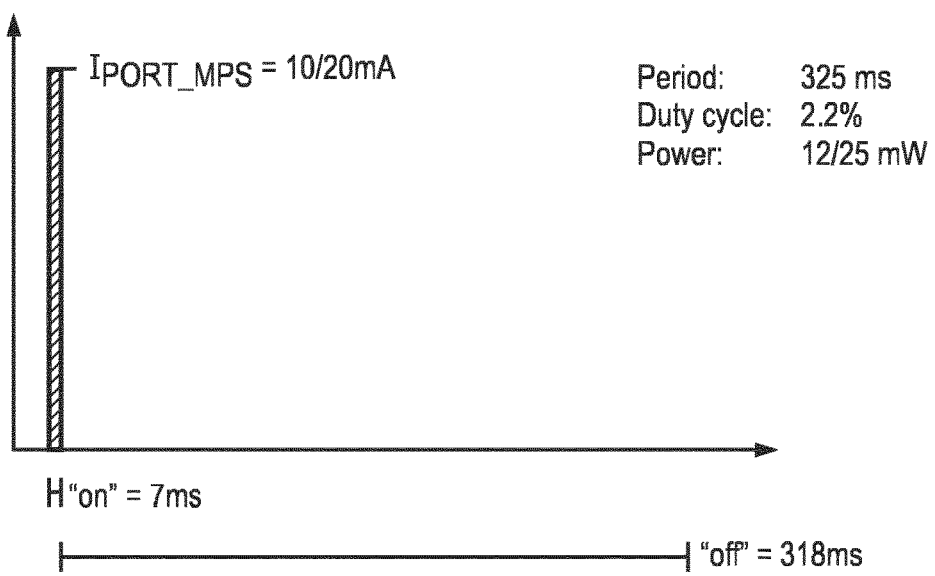
FIG. 13 shows schematically and exemplarily an overview of MPS timing according to an embodiment of the invention from the PD side.

FIG. 9A and FIG. 9B each show schematically and exemplarily an embodiment of the method according to the invention. FIG. 9A shows a method for generating a current pulse in a powered device electrically coupled to a power providing device, the method comprising a first step (900) of electrically decoupling at least part of the powered device from the power providing device; and a second step of (902) consuming electrical energy received from the power providing device.

FIG. 9B shows a method for generating a current pulse in a powered device electrically coupled to a power providing device, the method comprising a first step (910) of storing electrical energy received from the power providing device in a storage component; a second step (912) of electrically decoupling at least part of the powered device from the power providing device; and a third step (914) of consuming the electrical energy stored in the storage components.

FIG. 10, FIG. 11, FIG. 12 and FIG. 13 each show an example of MPS timing, respectively from the perspective of a PSE and PD according to IEEE 802.3af/at standards, and from the perspective of a PSE and PD as can be implemented in a system as per an embodiment of the invention. On the side of the PSE, the minimum current that must be sensed to maintain power on a port $I_{HOLD(min)}$ is 5 mA and the maximum $I_{HOLD(max)}$ is 10 mA. This MPS must be sensed for 60 ms and there cannot be more than 300 ms to 400 ms between each pulse. On the PD side the MPS is generated, for example, through a 10 mA pulse that lasts 75 ms and is followed by a period of 250 ms where no current (or less than 10 mA) is used. With a typical voltage provided in a PoE system, this MPS can require 131 mW of electrical energy.

When the invention is applied to a PSE, the PSE can be altered to maintain power on a port when a pulse is detected that is 5 ms long. The minimum current of the MPS can be set to 5 mA to 10 mA and the maximum to 10 mA to 20 mA. After each MPS, there does not need to be any current flow for 355 ms to 400 ms. On the PD side, the MPS is generated by consuming 10 to 20 mA within 7 ms, followed by a period of 318 ms in which (virtually) no energy is consumed.

The examples provided related to MPS timing, minimum and maximum currents, etc. are used for illustration purposes only and in no way limit the scope of the invention.

Although in the embodiments described above the electrical load comprised by the luminaire is a light-emitting diode (LED), in another embodiment the electrical load may be an organic light-emitting diode (OLED), a laser, a halogen lamp or the like.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Determinations like the determination of the power level of the electrical load power, the negotiation procedures, et cetera performed by one or several units or devices can be performed by any other number of units or devices. The procedures and/or the control of the powered device in accordance with the method for providing an electrical load power to an electrical load of the powered device within the power distribution system can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A power distribution system comprising:
   a power providing device arranged for providing power,
   a powered device, comprising a load, the powered device arranged for being detachably, electrically coupled to the power providing device, and further arranged for being powered by the power providing device; and
   an electrical conductor arranged for detachably, electrically coupling the power providing device to the powered device, and further arranged for transferring the power from the power providing device to the powered device,
   wherein the power providing device is further arranged for sensing a current flow from the power providing device to the powered device, and for providing power when, at least periodically, a current equal to or greater than a minimum current is sensed,
   wherein the powered device is further arranged for operating in a standby mode wherein, at least part of the time, the load draws a current smaller than the minimum current, and in an operational mode wherein, at least part of the time, the load draws a current equal to or greater than the minimum current,
   wherein the powered device further comprises a controllable switch, arranged for electrically decoupling at least part of the powered device, comprising a bulk capacitor, from the power providing device,
   wherein the powered device further comprises a pulse generator circuit, arranged for drawing, for a pre-determined time period and with a pre-determined frequency, a pulse current equal to or greater than the minimum current from the power providing device, when the powered device is operating in the standby mode, through controlling at least the controllable switch; and
   wherein the controllable switch is further arranged for decoupling the bulk capacitor when the pulse is generated to prevent the bulk capacitor from filtering out the pulse.

2. The power distribution system of claim 1, wherein the pulse generator circuit of the powered device comprises:
   a resistor arranged for consuming the pulse current,
   a pulse generator switch, placed in series with the resistor; and
   a controller arranged for controlling the pulse generator switch and the controllable switch,
   wherein the controller is further arranged for cycling between a pulse generation mode wherein the pulse generator switch is turned on and the controllable switch is turned off, for consuming the pulse current, and a non-pulse generation mode wherein the pulse generator switch is turned off and the controllable switch is turned on.

3. The power distribution system of claim 1, wherein the pulse generator circuit of the powered device comprises:
   a buffer capacitor arranged for storing electrical energy received from the power providing device when the controllable switch is turned on; and
   a controller arranged for controlling the controllable switch,
   wherein the controller is further arranged for cycling between a pulse generation mode wherein the controllable switch is turned on and the buffer capacitor is charged, and a non-pulse generation mode wherein the controllable switch is turned off and the electrical energy stored in the buffer capacitor is consumed.

4. The power distribution system of claim 1, wherein the powered device comprises a power converter, and wherein the pulse generator circuit of the powered device comprises a controller arranged for controlling the power converter and the controllable switch,
   wherein the controller is further arranged for cycling between a non-pulse generation mode wherein the controllable switch is turned on and storage components of the power converter are charged and a pulse generation mode wherein the controllable switch is turned off and the electrical energy stored in the storage components of the power converter is consumed.

5. The power distribution system of claim 4, wherein the power converter is controlled in a controlled input current mode.

6. The power distribution system of claim 1, wherein the powered device comprises a pulse transformer, and wherein the pulse generator circuit of the powered device comprises a controller arranged for controlling the pulse transformer and the controllable switch,
- wherein the controller is further arranged for cycling between a pulse generation mode wherein a primary current is generated in the primary winding of the pulse transformer, and a non-pulse generation mode,
- wherein the primary current generated in the primary winding of the pulse transformer in the pulse generation mode is transformed into a secondary current in the secondary winding of the pulse transformer, the secondary current equal to or greater than the minimum current,
- wherein the secondary winding of the pulse transformer is electrically coupled to a closed current loop with the power providing device,
- wherein the controllable switch is arranged for short circuiting the primary winding of the pulse transformer in the non-pulse generation mode.

7. The power distribution system of claim 6, wherein the powered device further comprises a current sensor arranged for sensing a current flow from the power providing device to the powered device, and wherein the controller is further arranged for adjusting the amplitude of the injected current by the pulse transformer based on the sensed current flow.

8. The power distribution system of claim 1, wherein the powered device is a Powered Device as specified in the Power over Ethernet standards and the powered device comprises a physical interface chip or chipset for receiving power over the electrical conductor; and wherein the pulse generator circuit is part of the physical interface chip or chipset.

9. The power distribution system of claim 1, wherein the powered device is a Powered Device as specified in the Power over Ethernet standards and wherein the powered device comprises an isolation switch, wherein the controllable switch is the isolation switch.

10. The power distribution system of claim 1, wherein the electrical conductor is an Ethernet cable.

11. The power providing device arranged to be used in a power distribution system of claim 1.

12. The powered device arranged to be used in a power distribution system of claim 1.

* * * * *